United States Patent
Ohrbom et al.

[11] Patent Number: 6,106,951
[45] Date of Patent: Aug. 22, 2000

[54] CURABLE COATING COMPOSITIONS CONTAINING CARMAMATE-FUNCTIONAL COMPOUNDS

[75] Inventors: Walter H Ohrbom, Hartland Township; Donald L. St. Aubin, Commerce Township; John W. Rehfuss, West Bloomfield, all of Mich.

[73] Assignee: BASF Corporation, Southfield, Mich.

[21] Appl. No.: 09/198,472

[22] Filed: Nov. 24, 1998

[51] Int. Cl.⁷ .......................... B32B 27/30; B32B 27/42; C09D 133/04; C09D 161/20

[52] U.S. Cl. ...................... 428/423.1; 428/425.8; 428/460; 428/463; 428/522; 428/524; 427/385.5; 427/388.3; 525/161; 525/162; 525/163

[58] Field of Search ...................... 525/161, 162, 525/163; 427/385.5, 388.3; 428/423.1, 425.8, 460, 463, 522, 524

[56] References Cited

U.S. PATENT DOCUMENTS 5,356,669  10/1994  Rehfuss ................. 427/407.1
5,552,497  9/1996  Taylor ...................... 525/456

*Primary Examiner*—Patricia A. Short
*Attorney, Agent, or Firm*—Anna M. Budde

[57] ABSTRACT

The invention provides a process that includes a first step of reacting the hydroxyl groups of a acrylic resin having hydroxyl groups and carbamate groups with a compound that converts the hydroxyl groups to new groups unreactive with an aminoplast crosslinker; a second step of combining the acrylic resin reaction product with at least an aminoplast crosslinker to form a coating composition; and a third step of applying the coating composition to a substrate and curing the applied coating layer, in which substantially no ether linkages are formed. Aminoplast crosslinkers are desirable for other reasons such as providing high solids coatings having excellent appearance that cure under moderate conditions. Avoiding the ether linkages that could be formed by reaction of aminoplast crosslinkers with hydroxyl groups improves the resistance of the cured coating to environmental etch.

18 Claims, No Drawings

CURABLE COATING COMPOSITIONS CONTAINING CARMAMATE-FUNCTIONAL COMPOUNDS

FIELD OF THE INVENTION

This invention concerns curable coating compositions, especially compositions for high-gloss topcoats, particularly for clearcoats of color-plus-clear composite coatings.

BACKGROUND OF THE INVENTION

Curable, or thermosettable, coating compositions are widely used in the coatings art, particularly for topcoats in the automotive and industrial coatings industry. Basecoat-clearcoat composite coatings are topcoats that offer exceptional gloss, depth of color, distinctness of image, or special metallic effects. The automotive industry has made extensive use of basecoat-clearcoat composite coatings for automotive body panels. Single-layer topcoats and the clearcoats of color-plus-clear composite coatings require an extremely high degree of clarity and gloss to achieve the desired visual effect. Such coatings require a low degree of visual aberrations at the surface of the coating in order to achieve the desired high gloss and high distinctness of image (DOI).

Because defects are so noticeable in the smooth, glossy surfaces required for these coatings, they are especially susceptible to a phenomenon known as environmental etch. "Environmental etch" is a term applied to a kind of exposure degradation that is characterized by spots or marks on or in the finish of the coating that often cannot be rubbed out. It has been difficult to predict the degree of resistance to environmental etch that a high gloss topcoat or color-plus-clear composite coating will exhibit. Many coating compositions known for their durability and/or weatherability when used in exterior paints, such as traditional high-solids enamels in which a hydroxyl-function acrylic polymer is crosslinked with a melamine-formaldehyde resin, do not provide the desired level of resistance to environmental etch when used in high gloss coatings such as the clearcoat of a color-plus-clear composite coating. While the ether linkages formed by aminoplast resin crosslinkers like the melamine-formaldehyde resin with hydroxyl-functional resins are undesirable from the standpoint of resistance to environmental etch, aminoplast crosslinkers are desirable for other reasons such as providing high solids coatings having excellent appearance that cure under moderate conditions.

Recently, automotive coating compositions based on carbamate-functional acrylic resins have been shown to be more resistant to environmental etch damage. Curable coating compositions utilizing carbamate-functional acrylic resins are described, for example, in U.S. Pat. Nos. 5,356,669, 5,474,811, 5,552,497, 5,559,195, 5,605,965, 5,639,554, 5,639,828, and 5,726,246, each of by reference. Carbamate groups can be crosslinked at moderate temperatures with melamine-formaldehyde resins or other aminoplast resins. The coating compositions can thus take advantage of many of the benefits of aminoplast resins while at the same time forming coatings that are resistant to environmental etch degradation.

U.S. Pat. No. 5,356,669, for example, describes methods of preparing an acrylic polymer having carbamate functionality. One suggested method is to react a cyclic carbonate-functional acrylic with ammonia to form the carbamate group or groups. A carbonate-functional monomer could similarly be converted to a carbamate-functional monomer and then carbamate-functional monomer in turn used in the polymerization of the carbamate-functional acrylic polymer. These synthetic routes to producing the carbamate functionality have advantages. A drawback to the carbonate ring-opening synthesis is that the reaction also produces a hydroxyl group that may then react with an aminoplast crosslinker (as in the traditional enamel compositions) to form undesirable ether linkages.

Other methods that have been suggested for preparing a carbamate-functional acrylic polymer also result or potentially result in an acrylic polymer that has hydroxyl functionality in addition to the desired carbamate functionality. U.S. Pat. No. 5,553,497 describes a method of transesterification of a hydroxy-functional acrylic with a carbamate compound to produce a carbamate-functional acrylic polymer. In this case, again, the acrylic polymer may have hydroxyl groups in addition to the carbamate groups, as some of the hydroxyl groups would be expected to remain unconverted. In a different synthesis, U.S. Patent No. 5,552,497 discloses a simultaneous addition polymerization of hydroxy functional acrylic monomer and esterification with an alkyl carbamate such as methyl carbamate to produce a carbamate functional acrylic polymer. The simultaneous polymerization and esterification avoids problems of incompatibility of carbamate-containing monomer in the polymerization mixture and undesirable molecular weight gains during transesterification of a pre-formed hydroxyl-functional acrylic polymer. The acrylic polymer may have hydroxyl groups, however, if the esterification reaction is not complete. Another method of producing carbamate functionality is to react a hydroxyl group with HNCO, produced by the thermal decomposition of urea, as is described in U.S. Pat. No. 5,605,965. Hydroxyl functionality remains on the acrylic polymer when less than a stoichiometric amount of the HNCO is reacted.

While each of the methods just described is feasible for producing acrylic polymers having carbamate groups, residual hydroxyl groups may produce undesirable ether linkages with aminoplast crosslinking agents. It would thus be desirable to render the hydroxyl functionality incapable of reacting with the aminoplast crosslinker so that only the carbamate groups form crosslinks during curing of the acrylic resin in order to maximize resistance of the cured coating to environmental etch.

SUMMARY OF THE INVENTION

The present invention provides a method of forming a primary carbamate-functional acrylic polymer for a curable coating composition that includes a step of converting all hydroxyl groups of an acrylic resin having hydroxyl groups and primary carbamate groups to new groups that do not react with the aminoplast crosslinker when a coating composition containing the converted acrylic resin and an aminoplast crosslinker is cured. The conversion of the hydroxyl groups prevents reaction of the hydroxyl groups with the aminoplast crosslinkers to form ether linkages when curing the coating. Thus, by saying that the groups from the conversion do not react with the aminoplast crosslinker, it is meant that the groups are unreactive with the aminoplast crosslinker under the conditions at which the reaction with carbamate groups takes place. When used in connection with the invention, the term "primary carbamate group" refers to a group having a structure

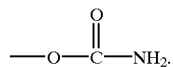

The invention further provides a coating composition formed by the method of the invention and an article having a substrate upon which there is a cured coating derived from a coating composition according to the invention.

DETAILED DESCRIPTION

The process according to the present invention includes a first step of converting the hydroxyl groups of an acrylic resin having hydroxyl groups and primary carbamate groups to new groups unreactive with an aminoplast crosslinker, particularly by reaction of the hydroxyl groups with a compound therefor; a second step of combining the acrylic resin with the new groups with at least an aminoplast crosslinker to form a coating composition; and a third step of applying the coating composition to a substrate and curing the applied coating layer, whereby substantially no ether linkages are formed.

The acrylic resin having hydroxyl groups and primary carbamate groups can be formed by a number of means. One method of introducing primary carbamate functionality onto an acrylic polymer is to react a cyclic carbonate-functional acrylic with ammonia to form the carbamate groups. Cyclic carbonate-functional acrylic polymers are known in the art and are described, for example, in U.S. Pat. No. 2,979,514, the disclosure of which is incorporated herein by reference. The ring-opening reaction also produces a hydroxyl group beta to the primary carbamate group.

A carbonate-functional monomer could similarly be converted to a β-hydroxy primary carbamate-functional monomer and the β-hydroxy primary carbamate-functional monomer in turn used in the polymerization of the acrylic resin having hydroxyl groups and primary carbamate groups. In addition, carbonate functionality can be obtained by reacting a monomer having an oxirane (or epoxide) group by reaction with $CO_2$. This can be done at any pressure from atmospheric up to supercritical $CO_2$ pressures, but is preferably under elevated pressure (e.g., 60–150 psi). The temperature for this reaction is preferably 60–150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, KI) preferably in combination with crown ethers, tin octoate, calcium octoate, and the like. The cyclic carbonate group can then be converted to a carbamate group as described above. As in the case of a carbonate-functional monomer, the conversion of an oxirane group to a carbamate group can be carrier out before, during, or after the addition polymerization reaction. Suitable oxirane-functional monomers include, without limitation, glycidyl acrylate, glycidyl methacrylate, and allyl glycidyl ether. Any unsaturated bond can also be converted to a carbamate group by first reacting with peroxide to convert to an epoxy group, then with $CO_2$ to form a cyclic carbonate, and then with ammonia or a primary amine to form the carbamate. Due to the reactivity of the ethylenic unsaturation of the reactive monomers, the synthesis of the carbamate functionality should be carried out after the addition polymerization. For example, an unsaturated bond can be introduced to the acrylic polymer by including allyl methacrylate in the polymerization or by introduction of unsaturation onto the formed acrylic polymer, such as by reaction of hydroxyl on the polymer with isocyanatoethyl methacrylate.

In another method, a hydroxy-functional acrylic may be transesterified with an alkyl primary carbamate compound to produce a primary carbamate-functional acrylic polymer. The acrylic polymer also has hydroxyl groups when not all of the hydroxyl groups are esterified. While using an excess of the esterifying carbamate compound would tend to drive the esterification reaction to completion, the use of excess carbamate compound could result in unwanted side reactions and/or would require removing the residual excess of the carbamate compound after completion of the esterification. It is thus preferred not to use an excess of carbamate compound but rather to allow some of the hydroxy groups to remain. Illustrative examples of alkyl primary carbamates useful for the transesterification include, without limitation, methyl carbamate, ethyl carbamate, propyl carbamate, isopropyl carbamate, butyl carbamate, 2-ethylhexyl carbamate, cyclohexyl carbamate, phenyl carbamate, hydroxypropyl carbamate, hydroxyethyl carbamate, and so on. The transesterification may be carried out using a catalyst such as, for example, organometallic complexes, including tin compounds such as dibutyltin oxide, dibutyltin dilaurate, dibutyltin diacetate, dibutytin dimethoxide; aluminum compounds such as aluminum isopropoxide; zinc compounds, titanates, and strong acid catalysts. The amount of such esterification catalyst can range from about 0.05 percent to about 5 percent by weight of the reactants. Typically, the esterification catalyst will be from about 0.1 to about 1% by weight of the reactants.

Another method of preparing an acrylic resin having hydroxyl groups and primary carbamate groups is disclosed in U.S. Pat. No. 5,552,497. The polymerization of the acrylic polymer is carried out using a hydroxy functional monomer. At the same time, the hydroxy group of this monomer is esterified by including in the polymerization mixture an alkyl carbamate, such as any of those mentioned above. Attempting to drive the esterification reaction to completion involves the same problems already discussed for the sequential polymerization-esterification method just described. The resulting polymer will contain hydroxyl groups when the esterification of the hydroxyl groups is not complete, whether due to a stoichiometric excess of hydroxyl groups or due to reaction conditions. Again, a transesterification catalyst may be used at levels of from about 0.05 percent to about 5 percent, preferably from about 0.1 to about 1%, by weight of the reactants (which in this case are the monomers). The transesterification catalyst can be added in a single charge at the beginning of the reaction, but is preferably divided into two portions, one of which is added at the beginning of the reaction and the other of which is added after completion of the addition polymerization reaction.

A further example of a method of producing primary carbamate functionality is to react a hydroxyl group with HNCO, produced by the thermal decomposition of urea, as is described in U.S. Pat. No. 5,605,965. Hydroxyl functionality remains on the acrylic polymer when less than a stoichiometric amount of the HNCO is reacted or if the reaction is not carried to completion.

The acrylic resin preferably has a molecular weight of from about 500 to about 1,000,000, and more preferably from about 1500 to about 50,000. As used herein, "molecular weight" refers to number average molecular weight, which may be determined by the GPC method using a polystyrene standard. The primary carbamate-bearing monomer unit may be from about 10 to about 90 weight percent of the acrylic resin and preferably is from about 40 to about 60 weight percent of the acrylic resin.

In any of the methods involving formation of the acrylic resin having hydroxyl groups and primary carbamate groups from a hydroxyl-functional acrylic resin, the hydroxyl-functional acrylic resin may be formed by using a hydroxyl-functional ethylenically unsaturated monomer in the polymerization of the acrylic resin. Useful hydroxyl-functional-ethylenically unsaturated monomers include, without limitation, hydroxyethyl methacrylate, hydroxyethyl acrylate, hydroxypropyl acrylate, hydroxypropyl methacrylate, hydroxybutyl acrylate, hydroxybutyl methacrylate, the reaction product of methacrylic acid with styrene oxide, and so on. Preferred hydroxyl monomers are methacrylic or acrylic acid esters in which the hydroxyl-bearing alcohol portion of the compound is a linear or branched hydroxy alkyl moiety having from 1 to about 8 carbon atoms.

The monomer bearing the hydroxyl group, carbamate group, epoxy group, non-polymerizing unsaturation, or carbonate group may be polymerized with one or more other ethylenically unsaturated monomers. Such monomers for copolymerization are known in the art. Illustrative examples include, without limitation, alkyl esters of acrylic or methacrylic acid, e.g., methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, amyl acrylate, amyl methacrylate, isoamyl acrylate, isoamyl methacrylate, hexyl acrylate, hexyl methacrylate, 2-ethylhexyl acrylate, decyl acrylate, decyl methacrylate, isodecyl acrylate, isodecyl methacrylate, dodecyl acrylate, dodecyl methacrylate, cyclohexyl acrylate, cyclohexyl methacrylate, substituted cyclohexyl acrylates and methacrylates, 3,5,5-trimethylhexyl acrylate, 3,5,5-trimethylhexyl methacrylate, the corresponding esters of maleic, fumaric, crotonic, isocrotonic, vinylacetic, and itaconic acids, and the like; and vinyl monomers such as unsaturated m-tetramethyl xylene isocyanate, styrene, t-butyl styrene, alpha-methyl styrene, vinyl toluene and the like. Other useful polymerizable comonomers include, for example, alkoxyethyl acrylates and methacrylates, acryloxy acrylates and methacrylates, ethylenically unsaturated carboxylic acids such as acrylic acid, methacrylic acid, itaconic acid, crotonic acid, maleic acid, and fumaric acid; ethylenically unsaturated tertiary amino compounds such as N,N'-dimethylaminoethyl methacrylate, 2-vinylpyridine, 4-vinylpyridine, and vinylpyrrolidine; and compounds such as acrylonitrile, methacrylonitrile, acrolein, and methacrolein. Combinations of these are usually employed.

The inventive process includes a step of converting the hydroxyl groups of an acrylic resin having hydroxyl groups and primary carbamate groups to new groups, preferably by reacting with a material that converts the hydroxyl groups to a new moiety that does not react with the aminoplast crosslinker during the curing of the coating composition. Avoiding the ether linkages that could be formed by reaction of aminoplast crosslinkers with hydroxyl groups improves the resistance of the cured coating to environmental etch. In addition, in the case of beta-hydroxy carbamates, removing the beta-hydroxy group improves the stability of the acrylic resin, as beta-hydroxy carbamate groups may ring-close under certain conditions. The ring-closure could potentially prevent the coating composition from fully curing.

A number of different materials may be reacted with the hydroxyl groups of the acrylic resin having hydroxyl groups and primary carbamate groups to convert the hydroxyl groups to new groups. Preferably, the material is selected from monofunctional isocyanates, acid anhydrides of difunctional carboxylic acids, acid anhydrides of monofunctional carboxylic acids, monofunctional carboxylic acids, alkyl halides including alkyl chlorides, and combinations of these.

The monofunctional isocyanates may be aromatic, arylaliphatic, or aliphatic. Preferably, the monofunctional isocyanate material includes a monofunctional isocyanate compound that is an aliphatic compound, including cycloaliphatic compounds. The monofunctional isocyanate compound could include other groups that are nonreactive in the reaction, such as ester groups or acid groups. Examples of suitable monofunctional isocyanate compounds include, without limitation, butyl isocyanate, propyl isocyanate, octyl isocyanate, cyclohexyl isocyanate, alkyl isocyanatoacetates such as ethyl isocyanatoacetate, and combinations of these.

When the hydroxyl groups are reacted with an acid anhydride of a monocarboxylic acid or a dicarboxylic acid, the residual acid group is not expected to react with the aminoplast crosslinker to any significant extent at the curing temperature for the carbamate group reaction with the aminoplast crosslinker. In any event, the reaction would not result in an ether group. Suitable acid anhydride compounds include, without limitation, acetic anhydride, maleic anhydride, malonic anhydride, glutaric anhydride, and combinations of these.

The hydroxyl groups on the acrylic resin having hydroxyl groups and primary carbamate groups may also be reacted with monofunctional acids in an esterification reaction. Suitable monofunctional acids include, without limitation, acetic acid, butyric acid, octanoic acid, neoacids (many of which are commercially available from Exxon), and combinations of these. The hydroxyl groups may also be reacted with acid halides, preferably acid chlorides, in a reaction in which the hydroxyl group is esterified. Examples of useful acid halides include, without limitation, acetyl chloride, propionyl chloride, butyryl chloride, and so on.

In another method of converting the hydroxyl groups to new groups that will not form an ether linkage with the aminoplast crosslinker during curing of the coating composition, the acrylic resin having hydroxyl groups and primary carbamate groups may be reacted with an alkyl haloformate, particularly an alkyl chloroformate. The reaction forms an ester group with HCl as a by-product. Suitable examples of alkyl haloformates include, without limitation, ethyl chloroformate, propyl chloroformate, and combinations of these.

In a further step of the process of the invention, the acrylic resin reaction product that has primary carbamate groups and the new groups resulting from conversion of the hydroxyl groups is combined with at least an aminoplast crosslinker to form a coating composition. The aminoplast crosslinker has, on average, at least about two functional groups reactive with the acrylic resin. Aminoplast crosslinkers, by which we mean to include phenol/formaldehyde adducts, are characterized as having active methylol or methylalkoxy groups. Examples of preferred curing agent compounds include, without limitation, melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), and resins having polymerized isobutoxymethyl acrylamide groups. The curing agent may be combinations of these. Combinations of tris(alkoxy carbonylamino) triazine with a melamine formaldehyde resin and/or a blocked isocyanate curing agent are likewise suitable and desirable.

The coating composition may contain other materials having carbamate or urea groups. First, the coating composition may includes a component (a) having at least one carbamate group or urea group and having a lactone or hydroxy carboxylic acid moiety. When used in connection with the invention, the term "carbamate group" refers to a group having a structure

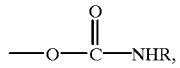

in which R is H or alkyl. Preferably, R is H or alkyl of from 1 to about 4 carbon atoms, and more preferably R is H (a primary carbamate). When used in connection with the invention, terminal urea group refers to a group having a structure

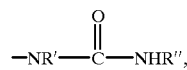

in which R' and R" are each independently H or alkyl, or R' and R" together form a heterocyclic ring structure. Preferably, R' and R" are each independently H or alkyl of from 1 to about 4 carbon atoms or together form an ethylene bridge, and more preferably R' and R" are each independently H. The terminal urea group of the invention is distinguished from urea linking groups for which R" would be other than alkyl.

Preferred compounds (a) may be represented by the structures

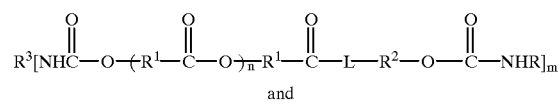
and
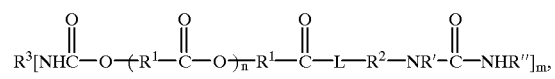

in which R, R', and R" are as previously defined; $R^1$ is alkylene or arylalkylene, preferably alkylene, and particularly alkylene of 5 to 10 carbon atoms; $R^2$ is alkylene or substituted alkylene, preferably having from about 2 to about 4 carbon atoms; $R^3$ is alkylene (including cycloalkylene), alkylarylene, arylene, or a structure that includes a cyanuric ring, a urethane group, a urea group, a carbodiimide group, a biuret structure, or an allophonate group, preferably alkylene (including cycloalkylene) or a structure that includes a cyanuric ring; n is from 0 to about 10, preferably from 0 to about 5; m is from 2 to about 6, preferably 2 or 3; and L is O, NH, or $NR^4$, where $R^4$ is an alkyl, preferably an alkyl of 1 to about 6 carbon atoms.

The compound (a) may be prepared by a process that involves a step of reacting together a lactone or a hydroxy carboxylic acid and a compound comprising a carbamate or urea group or a group that can be converted to a carbamate or urea group and a group that is reactive with the lactone or hydroxy carboxylic acid. In the case of a group that can be converted to a carbamate or urea group, the group is converted to the carbamate or urea group either during or after the reaction with the lactone or hydroxy carboxylic acid. The process for preparing compound (a) may include a further step in which a hydroxyl-functional product of the first step is reacted with a compound having at least two isocyanate groups.

The coating composition may include a component (b) having at least one carbamate group or terminal urea group according to the invention and having at least two linking groups that are urethane or urea. Preferred compounds (b) may be represented by any of the structures

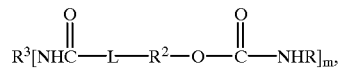

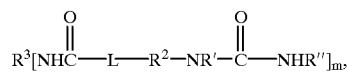

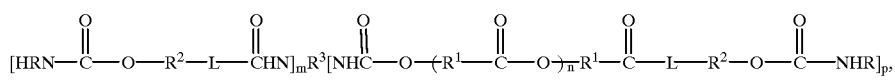

and

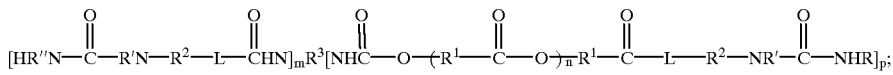

in which R, R', R", $R^2$, $R^3$, L, and m are as previously defined; p is from 1 to 5, preferably 1 or 2, and m+p is 2 to 6, preferably about 3. Preferably, $R^3$ is alkylene (including cycloalkylene), alkylarylene, arylene, or a structure that includes a cyanuric ring.

The compound (b) may be prepared by a process having a step of reacting together a polyisocyanate (b)(2) and a compound (b)(1) having a carbamate or terminal urea group or a group that can be converted to a carbamate or terminal urea group and also having a group that is reactive with isocyanate functionality. In the case of a group that can be converted to carbamate or terminal urea, the conversion to the carbamate or terminal urea group is carried out either at the same time as the reaction involving the polyisocyanate or afterwards to form the second component.

Finally, the coating composition can include a component (c) having at least two groups selected from carbamate groups, terminal urea groups, or combinations of the two and at least four urethane or urea linking groups. Preferred compounds (c) may be represented by any of the structures

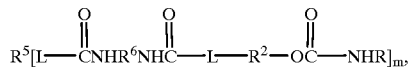

and

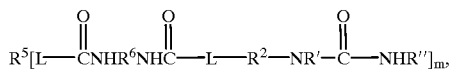

in which R, R', R", $R^2$, L, and m are as previously defined; $R^5$ and $R^6$ are each independently alkylene (including cycloalkylene), preferably having from 1 to about 18 carbon atoms, particularly preferably from about 5 to about 12 carbon atoms, alkylarylene, or arylene, or $R^6$ is a structure that includes a cyanuric ring, a biuret structure, or an allophonate group.

The compound (c) may be prepared by a synthesis that involves a step of reacting together a compound (c)(1) comprising a carbamate or terminal urea group or a group that can be converted to a carbamate or terminal urea group and also having an isocyanate group and a compound (c)(2) having at least two groups reactive with isocyanate functionality. When the compound (c)(1) comprises a group that can be converted to a carbamate or terminal urea group, the conversion to carbamate or urea may take place at the same time as the reaction with the compound having at least two groups reactive with isocyanate functionality or after that reaction is completed, to generate the component (c). Further details of components (a), (b), and (c) are described in U.S. patent application Ser. No. 09/184,195, filed Nov. 2, 1998, incorporated herein by reference.

A solvent may optionally be included in the coating composition. Although the coating composition may be utilized, for example, in the form of substantially solid powder or a dispersion, it is often desirable that the composition is in a substantially liquid state, which can be accomplished with the use of a solvent. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

The coating composition used in the practice of the invention may include a catalyst to enhance the cure reaction. For example, aminoplast compounds, especially monomeric melamines, may use a strong acid catalyst to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

Additional agents, for example surfactants, fillers, stabilizers, wetting agents, dispersing agents, adhesion promoters, UV absorbers, hindered amine light stabilizers, etc. may be incorporated into the coating composition. While such additives are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful cross-linkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

Coating compositions can be coated on the article by any of a number of techniques well-known in the art. These include, for example, spray coating, dip coating, roll coating, curtain coating, and the like. For automotive body panels, spray coating is preferred.

The coating compositions described herein are preferably subjected to conditions so as to cure the coating layers. Although various methods of curing may be used, heatcuring is preferred. Generally, heat curing is effected by exposing the coated article to elevated temperatures provided primarily by radiative heat sources. Curing temperatures will vary depending on the particular blocking groups used in the crosslinking agents, however they generally range between 90° C. and 180° C. The first compounds according to the present invention are preferably reactive even at relatively low cure temperatures. Thus, in a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following examples. The examples are merely illustrative and do not in any way limit the scope of the invention as described and claimed. All parts are parts by weight unless otherwise noted.

EXAMPLES

Comparative Example A

A mixture of 824.5 parts by weight of the cyclic carbonate of glycidyl methacrylate (prepared by reacting glycidyl methacrylate with carbon dioxide under pressure), 762.6 parts by weight of 2-ethylhexyl acrylate, and 129.8 parts by weight of VAZO® 67 (available from Dupont) was added over four hours to refluxing 995.3 parts of propylene glycol monomethyl ether acetate. Following this addition, a mixture of 76.4 parts by weight of propylene glycol monomethyl ether acetate and 24.3 parts by weight of VAZO® 67 was added. The reaction mixture was then cooled to room temperature and 850.1 parts by weight of methanol were added. Ammonia gas was then bubbled into the reaction mixture until hydroxy carbamate formation was complete. The excess ammonia and methanol were then removed by vacuum distillation. The final nonvolatile content for this resin was 60% by weight.

Example 1

A mixture of 1164 parts by weight of the resin of Comparative Example A and 0.4 parts by weight of dibutyl tin dilaurate was heated to 47° C. under an inert atmosphere. Then 226 parts by weight of cyclohexyl isocyanate were added. When all of the isocyanate had been added, the temperature of the reaction mixture was slowly increased to 100° C. After the reaction was complete, 206.8 parts by weight of propylene glycol monomethyl ether acetate and 10 parts by weight of n-butanol were added. The final nonvolatile content for this resin was 60.1% by weight.

Comparative Example B

A mixture of 549.6 parts by weight of the cyclic carbonate of glycidyl methacrylate (prepared by reacting glycidyl methacrylate with carbon dioxide under pressure), 339.5 parts by weight of 2-ethylhexyl acrylate, 322.5 parts by weight styrene, 93.4 parts by weight 2-ethylhexyl methacrylate, 342.9 parts b weight methyl methacrylate, and 131.7 parts by weight of VAZO® 67 (available from Dupont) was added over four hours to refluxing 995.3 parts of propylene glycol monomethyl ether acetate. Following this addition, a mixture of 77.6 parts by weight of propylene glycol monomethyl ether acetate and 24.7 parts by weight of VAZO® 67 was added. The reaction mixture was then cooled to room temperature and 863 parts by weight of methanol were added. Ammonia gas was then bubbled into the reaction mixture until hydroxy carbamate formation was complete. The excess ammonia and methanol were then removed by vacuum distillation. The final nonvolatile content for this resin was 56.7% by weight.

Example 2

A mixture of 1350 parts by weight of the resin of Comparative Example B and 0.4 parts by weight of dibutyl tin dilaurate was heated to 65° C. under an inert atmosphere. Then 156.3 parts by weight of cyclohexyl isocyanate were added. When all of the isocyanate had been added, the temperature of the reaction mixture was slowly increased to 100° C. After the reaction was complete, 20 parts by weight of propylene glycol monomethyl ether acetate and 10 parts by weight of n-butanol were added. The final nonvolatile content for this resin was 62.8% by weight.

Preparation of Additive Resin

An additive resin for the coating composition evaluation is prepared by reacting together 51.7 parts by weight of hydroxypropyl carbamate and 48.3 parts by weight of isophorone isocyanate in a 50:50 by weight mixture of propylene glycol monomethyl ether acetate and amyl acetate using a dibutyl tin dilaurate catalyst using the procedure of Example 1 in U.S. Pat. No. 5,373,069, incorporated herein by reference (omitting the 2-ethyl-1,3-hexanediol reactant). The final product has a nonvolatile content of 65.4% by weight.

Coating Composition Evaluation

Clearcoat coating compositions containing the resins of Examples 1 and 2 and Comparative Examples A and B were prepared as indicated in the following Table. The clearcoat coating compositions were evaluated by coating primed panels with a black basecoat and then one of the clearcoat compositions wet-on-wet. The coated panels were cured by baking at 120° C. for 30 minutes. The cured clearcoat films were about 1.8 to 2.0 mils thick. The coated panels were then subjected to outdoor exposure testing for 14 weeks in a Jacksonville, Fla. environmental etch testing program. The amount of environmental etch was rated on a scale of 1 to 10, with 1 being no or little film damage and 10 being severe film damage.

formed in step (b) do not react with the aminoplast crosslinker during the curing of step (d).

2. A process according to claim 1, wherein the acrylic resin provided in step (a) is formed by reacting a cyclic carbonate-functional acrylic resin with ammonia.

3. A process according to claim 1, wherein the acrylic resin provided in step (a) is formed by a polymerization reaction using a β-hydroxy carbamate-functional monomer.

4. A process according to claim 1, wherein the acrylic resin provided in step (a) is formed by transesterification of a hydroxyl-functional acrylic resin with an alkyl carbamate compound.

5. A process according to claim 4, wherein the alkyl carbamate compound is selected from the group consisting of methyl carbamate, ethyl carbamate, propyl carbamate, isopropyl carbamate, butyl carbamate, 2-ethylhexyl carbamate, cyclohexyl carbamate, phenyl carbamate, hydroxypropyl carbamate, hydroxyethyl carbamate.

6. A process according to claim 1, wherein the acrylic resin provided in step (a) is formed by a polymerization reaction using a monomer having a hydroxyl group and a simultaneous transesterification of the hydroxy group with an alkyl carbamate.

7. A process according to claim 1, wherein the acrylic resin provided in step (a) is formed by reaction of a hydroxyl-functional acrylic resin with HNCO.

TABLE OF CLEARCOAT COATING COMPOSITION EXAMPLES

|  | Example 3 | Comparative Example C | Example 4 | Comparative Example D | Example 5 | Comparative Example E | Example 6 | Comparative Example F |
|---|---|---|---|---|---|---|---|---|
| Resin of Example 1 | 132.1 | — | — | — | 132.1 | — | 97.9 | — |
| Resin of Comp. Ex. A | — | 132.3 | — | — | — | 122.4 | — | 98.0 |
| Resin of Example 2 | — | — | 107.3 | — | — | — | — | — |
| Resin of Comp. Ex. B | — | — | — | 118.8 | — | — | — | — |
| Additive Resin | — | — | 21.5 | 21.5 | — | — | 28.2 | 28.2 |
| Hexamethoxy Methylated Melamine | 15.5 | 15.5 | 13.5 | 13.5 | 21.5 | 21.5 | 17.7 | 17.7 |
| Additive Package[1] | 23.4 | 23.4 | 23.4 | 23.4 | 23.4 | 23.4 | 23.4 | 23.4 |
| Etch Rating, 14 wk Jacksonville | 7 | 9 | 3 | 5 | 7 | 9 (dull appearance) | 5 | 7 (dull appearance) |

[1]A mixture of 4.2 parts by weight of a light stabilizer package, 4 part by weight of a blocked sulfonic acid catalyst, and 0.2 part by weight of a rheological additive, and 15 parts by weight alcohol, ketone, and acetate solvents.

The invention has been described in detail with reference to preferred embodiments thereof. It should be understood, however, that variations and modifications can be made within the spirit and scope of the invention and of the following claims.

What is claimed is:

1. A process comprising steps of:

(a) providing an acrylic resin having hydroxyl groups and primary carbamate groups, (b) converting the hydroxyl groups of the acrylic resin to new groups, (c) combining the acrylic resin of step (b) having the new groups with at least an aminoplast crosslinker to form a coating composition, and (d) applying the coating composition to a substrate and curing the applied coating layer to produce a cured coating on the substrate; wherein the new groups 8. A process according to claim 1, wherein step (b) is carried out by reaction of the acrylic resin with a material selected from the group consisting of monofunctional isocyanates, acid anhydrides of difunctional carboxylic acids, acid anhydrides of monofunctional carboxylic acids, monofunctional carboxylic acids, alkyl halides, alkyl chlorides, and combinations thereof.

9. A process according to claim 8, wherein the material comprises a monofunctional isocyanate.

10. A process according to claim 8, wherein the material comprises butyl isocyanate.

11. A process according to claim 1, wherein the aminoplast crosslinker of step (c) is a melamine formaldehyde resin.

12. A process according to claim 1, wherein the coating composition of step (c) further includes a compound selected from the group consisting of compounds having structures

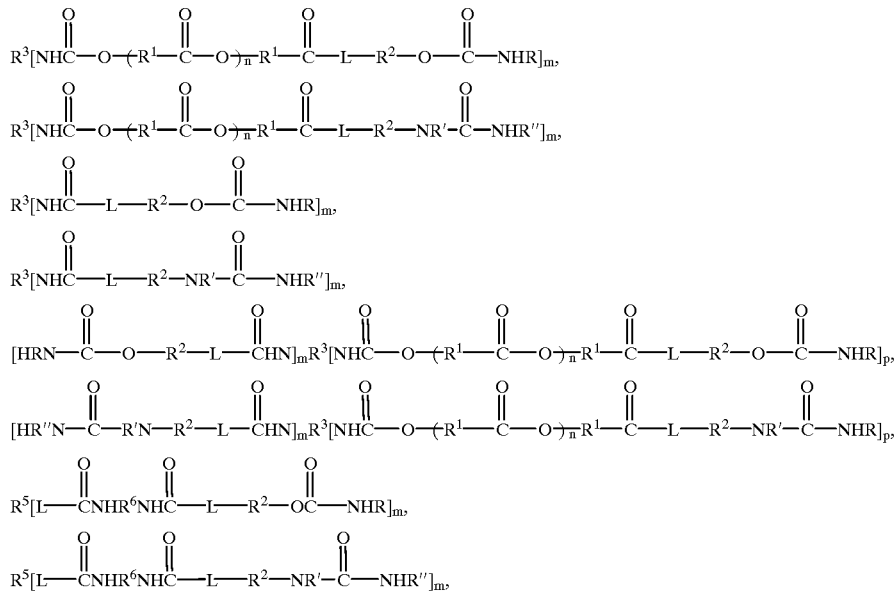

and mixtures thereof; wherein R is H or alkyl; R' and R" are each independently H or alkyl, or R' and R" together form a heterocyclic ring structure; $R^2$ is alkylene or substituted alkylene; $R^1$, $R^3$, $R^5$, and R" are independently alkylene, cycloalkylene, or arylalkylene, or $R^3$, $R^5$, and $R^6$ are independently arylene, or a structure that includes a cyanuric ring, a urethane group, a urea group, a carbodiimide group, a biuret structure, or an allophonate group; n is from 0 to about 10; m is from 2 to about 6; and L is O, NH, or $NR^4$, where $R^4$ is an alkyl; in which p is from 1 to 5, and m+p is 2 to 6; in which $R^5$ and $R^6$ are each independently alkylene, cycloalkylene, alkylarylene, or arylene, or $R^6$ is a structure that includes a cyanuric ring, a biuret structure, or an allophonate group.

13. A process according to claim 1, wherein the substrate of step (d) is selected from the group comprising metal and plastic substrates.

14. A process according to claim 1, wherein the coating composition of step (c) is a topcoat coating composition.

15. A process according to claim 1, wherein the coating composition of step (c) is a clearcoat coating composition.

16. A process according to claim 1, wherein the cured coating of step (d) is a high gloss coating.

17. A coating produced according to the process of claim 1.

18. A coating composition comprising:
(a) an acrylic resin having primary carbamate groups and at least one other type of groups, wherein the other type of groups that have been formed by conversion of hydroxyl groups, and
(b) an aminoplast crosslinker; wherein the new groups do not react with the aminoplast crosslinker under conditions for reacting the primary carbamate groups with the aminoplast crosslinker.

* * * * *